United States Patent [19]

Keck

[11] 4,175,429
[45] Nov. 27, 1979

[54] DEVICE FOR THE MEASUREMENT OF FORCES OR PRESSURES

[75] Inventor: Roland Keck, Dusseldorf, Fed. Rep. of Germany

[73] Assignee: Betriesbsforschungsinstitut VDEh Institut fur angewandte Forschung GmbH, Dusseldorf, Fed. Rep. of Germany

[21] Appl. No.: 886,043

[22] Filed: Mar. 13, 1978

[51] Int. Cl.² ............................................. G01L 5/00
[52] U.S. Cl. ................................................ 73/141 A
[58] Field of Search ..................... 73/141 A; 177/211

[56] References Cited

U.S. PATENT DOCUMENTS

| | | | |
|---|---|---|---|
| 3,453,873 | 7/1969 | Lambert | 73/141 A |
| 3,782,486 | 1/1974 | Kuhn et al. | 73/141 A |

Primary Examiner—Anthony V. Ciarlante
Attorney, Agent, or Firm—Holman & Stern

[57] ABSTRACT

An arrangement for measuring forces and pressures comprises a high-pressure sensitivity metal wire embedded in a low shear force material, such as flexible rubber, which is compressible within a load cell by means of a movable piston. The ends of the metal wire are connected to shank(s) of a jacket thermo-element which can be drawn out of the load cell under internal pressure.

9 Claims, 2 Drawing Figures

DEVICE FOR THE MEASUREMENT OF FORCES OR PRESSURES

The invention relates to an arrangement for measuring forces and pressures with a metal wire highly pressure-conditioned by its specific resistance value, bedded in a low shear force material such as rubber flexible material, which is compressed within a load-cell by means of a moving piston.

An arrangement of this type is known according to DT-OS No. 23 33 503.7 patent specification. The metal wire preferably consisting of Manganin is extensively arranged equally on the bearing surfaces, achieved more particularly by a meander-shaped disposition.

The load cell is drilled transversely to the loading direction in two points so as to pass the wire ends, the holes being of such a diameter that the connecting ends of the wire can be passed through sideways in the insulated condition, in order to allow further connections outside the load cell.

Nevertheless such arrangements require that part of the measuring wire remains pressure-free during the measurements.

The object of the invention, is to design an arrangement for the measurement of forces and pressures of the originally described type, in such a manner that on the one hand the whole of the pressure-conditioned measuring wire is exposed to the measured pressure in relation to its specific resistance value, and on the other hand the execution of the measurement is simplified by the load cell.

According to the invention this is achieved in that, a jacket thermo-element complete with shank(s) is taken through the inside of the load cell under pressure, the metal wire being connected at the ends with the shank.

Jacket thermo-elements are already basically known as for instance from "The Handbook of Technical Temperature Measurement", 1976, page 80 by Fritz Lieneweg. In according with the present invention, jacket thermo-elements are used with a thermocouple, one shank being formed by the jacket if required, within which the second shank is insulated within a highly-compressed powder-form oxide insulation means such as Magnesium or Aluminium oxide. Designs are also admissible in which both shanks are suitably insulated within a jacket. The points at which the insulated wire projects from the jacket at the end, are preferably separately sealed in the usual manner, for instance by means of synthetic resin. The outer ends can be connected in a known manner to the connector heads or plugs. On the other hand the inner ends are preferably connected by cold-compacting or brazing with the measuring wire.

The jacket thermo-element is preferably extended sideways out of the load-cell transversely to the direction of the forces applied. This has the advantage of allowing the complete load cell to be designed unusually flat.

The jacket thermo-elements as used have an external diameter between 0.15 and 3 mm more particularly. The cross-section required to admit the apertures sideways in the load cell for the purpose of the jacket thermo-elements, is thus unusually limited, so that even the greatest forces within the load cell only result in very limited displacement forces. The result is that the transfer of internal forces forces from the load cell is extensively free from loading.

The forces and pressures to be measured by means of the arrangement frequently have a strong dynamic pattern. Minimal movements in jacket thermo-elements reaching inside the load cell cannot be avoided, with the result that the insulating compound is subject to additional shifting in relation to the jacket material. Expulsion of the insulating material from the free end of the jacket thermo-element is avoided in the simplest manner, by ensuring that the jacket thermo-element is curved at the outlet from as well as inside the load cell. This curvature greatly increases the friction forces effective between the insulating material and the jacket, thus opposing the shift of the insulating material within the jacket.

The object according to the invention is also achieved further, in that a known pressure-sensitive resistance strain-gauge is arranged within the load cell and is arranged uniformly over the relevant internal surface of the load-cell cross-section. In this type of strain-gauge, the full length is used for measuring. It is surprising that the strain-gauge basically serving for pressure measurements, and also following the distortions of the objects under test, with reference to the securing means, also produces excellent measurement results as a force transmitter within the framework of the present invention. The strain-gauge sensor is also preferably a Manganin conductor.

The arrangement of a strain-gauge on an object to be tested, normally calls for careful bonding application, so that the strain-gauge follows any longitudinal changes in the object. According to the invention only the securing of the strain-gauge position is required, and this can be achieved by correspondingly simple bonding. Strain-gauges can also be insulated separately between the two faces of the base and piston adjoining the load cell. In this way the strain-gauge is insulated and bears upon one of the faces.

A combination of the two proposals according to the invention also provides for the connection of the strain-gauge with its end-connections to the shank of the jacket thermo-element. In this way on the one hand the whole of the metal providing for the measurement is subjected to the effects of the forces or pressures to be measured, whereas on the other hand, a very space-saving and particularly reliable method of leading out of the load-cell is ensured. Naturally the strain-gauge not only provides for wire-like sensors, but also for etched resistance patterns in a known manner.

Reference is made to the schematic drawings for further illustration of the designs given examples, wherein:

FIG. 1 is a side sectional view of the load-cell, whereas

The load-cell consists of a cylindrical body 1 in which the vulcanised silicon rubber layer 2 is bedded. This layer is stressed by the punch-like piston 3, a considerable movement being allowed between the cylinder wall and the outer face of the piston. In order that the clearance may be maintained as large as possible, an otherwise unnecessary seal ring 4 is provided.

Figure 1:
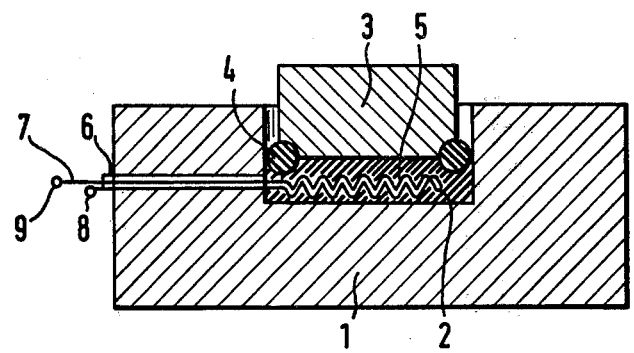

The resistance wire 5 is arranged in the manner illustrated in FIG. 1 to facilitate visibility, it normally being arranged so as to run with a much flatter stroke. Both end connections of the resistance wire 5 are connected to a shank formed by the jacket 6 of the jacket thermo-element and a shank formed by the thermo-wire 7. Both shanks are taken sideways through the cylinder body 1 in the manner as described, the jacket having an end connection 8 and a further end-connection 9 being provided on the inner thermo-wire.

Figure 2:
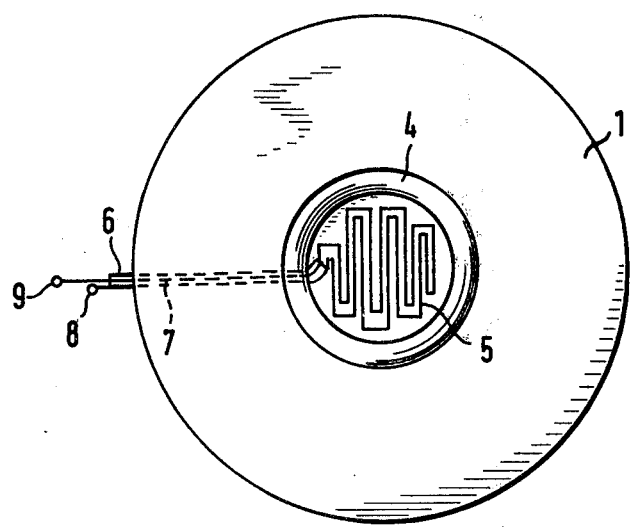
FIG. 2 is a view from the top according to FIG. 1, with the piston removed.

FIG. 2 shows more particularly the manner in which a suitably controlled strain-gauge fills the cross-section of the load-cell in meander-form. Both ends are on one side, and as already described, they are connected to the jacket 6 and the thermo-wire 7 of the jacket thermo-element.

I claim:

1. Arrangement for measuring forces and pressures with a high-pressure sensitivity metal wire according to its resistance value, bedded in a low shear force material such as flexible rubber material, compressed within a load-cell by means of a moving piston, characterised in that, a jacket thermo-element (6,7) is drawn complete with its shank(s) out of the load-cell under internal pressure, the said metal wire (5) being connected by its ends to the relevant shanks.

2. Arrangement to claim 1, characterised in that, the jacket thermo-element (6,7) is drawn sideways out of the load-cell transversely to the direction of the effect of the force.

3. Arrangement to claim 1, characterised in that, the jacket (6) of the jacket thermo-element has an external diameter of 0.15 to 3.0 mm.

4. Arrangement to claim 1, characterised in that, the jacket thermo-element (6,7) is curved inside the load-cell.

5. Arrangement for measuring forces and pressures with a metal wire of high pressure-sensitivity of its specific resistance value, bedded within a low shear-force material such as flexible rubber material, which is compressed by means of a sliding piston within a load-cell, characterised in that a pressure-sensitive resistance strain-gauge is distributed over the area equal to the internal cross-section of the load-cell.

6. Arrangement to claim 5, characterised in that, the strain gauge has a Manganin conductor as a sensor.

7. Arrangement to claim 5, characterised in that, the strain gauge is arranged separately and insulated between the two faces of the bottom and the cylinder adjoining the load-cell.

8. Arrangement to claim 7, characterised in that, the strain gauge is located immediately against one of the faces, within insulation.

9. Arrangement to claim 5, characterised in that, the strain gauge is connected by its end-connections to the shanks of a jacket thermo-element (6,7).

* * * * *